T. R. HUGO.
DUST PAN.
APPLICATION FILED JULY 20, 1914.
1,202,722.
Patented Oct. 24, 1916.
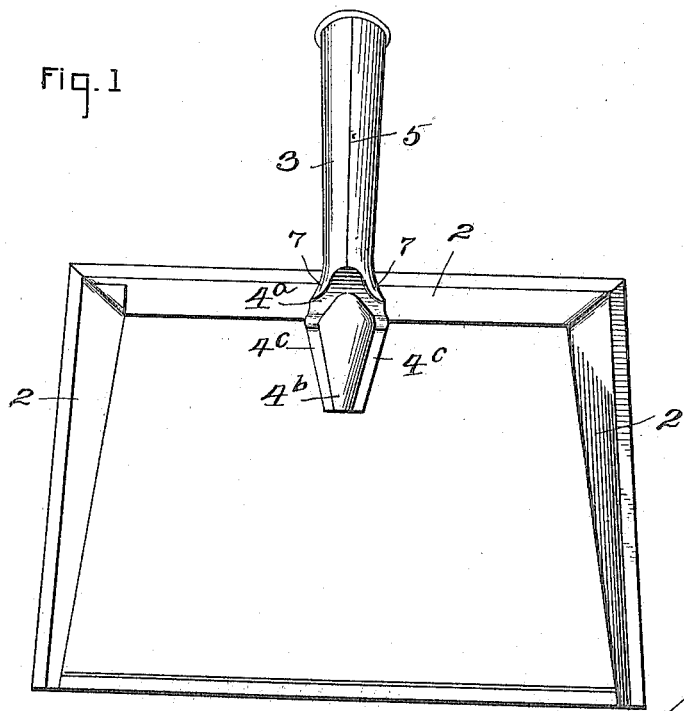
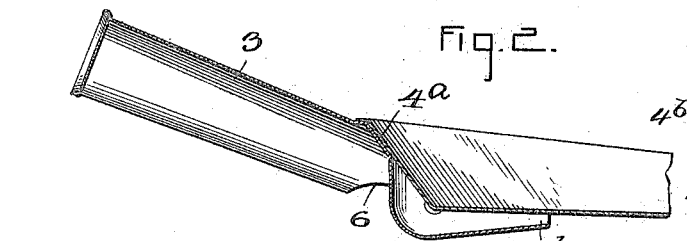
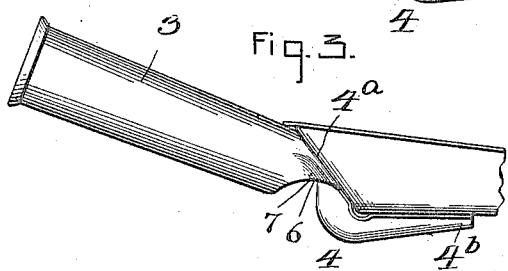
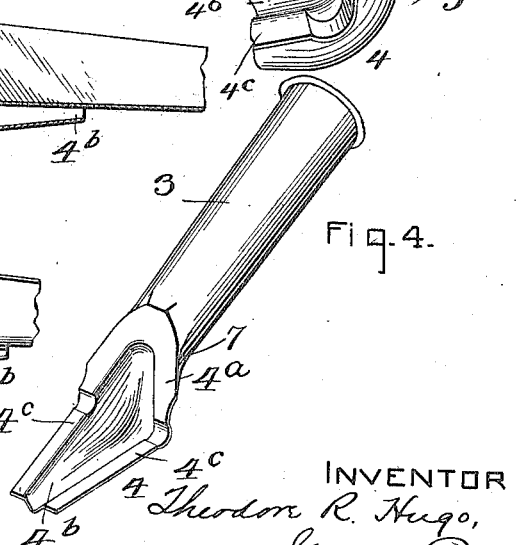
WITNESSES
INVENTOR
Theodore R. Hugo,
by Geyer & Popp
ATTORNEYS

UNITED STATES PATENT OFFICE.

THEODORE R. HUGO, OF BUFFALO, NEW YORK, ASSIGNOR TO REPUBLIC METALWARE COMPANY, OF BUFFALO, NEW YORK, A CORPORATION OF NEW YORK.

DUST-PAN.

1,202,722.   Specification of Letters Patent.   Patented Oct. 24, 1916.

Application filed July 20, 1914. Serial No. 851,854.

*To all whom it may concern:*

Be it known that I, THEODORE R. HUGO, a citizen of the United States, residing at Buffalo, in the county of Erie and State of New York, have invented new and useful Improvements in Dust-Pans, of which the following is a specification.

In dust pans as heretofore constructed, the boss is separate from the handle and soldered to the pan after the handle has been attached. This construction requires the pan and handle to be made of tin plate, to permit of such soldering.

One object of my invention is to so construct the handle and boss that the entire pan can be made of untinned plate, thus reducing its cost.

A further object is to simplify the construction of the handle and boss and facilitate their attachment to the pan.

In the accompanying drawings Figure 1 is a rear view of a dust pan embodying the invention. Fig. 2 is a fragmentary section thereof taken centrally through the handle and boss. Fig. 3 is a fragmentary side elevation of the pan. Fig. 4 is a perspective view of the handle and boss detached from the pan.

Similar characters of reference indicate corresponding parts throughout the several 1 indicates the body of the dust pan which has the usual inclined rim 2 extending around its back and sides.

3 indicates the handle of the pan and 4 the boss, both of which parts are formed in one piece from a blank of sheet metal, preferably untinned plate. In the preferred construction shown in the drawings, the longitudinal seam or joint 5 of the handle is located centrally at its back or under side. The boss is formed by a forward continuation or extension of the upper side of the handle and consists of an inclined rear portion 4ᵃ which bears against the corresponding rim of the pan and a substantially horizontal front portion 4ᵇ which bears against the underside of the pan body. This inclined portion extends downwardly from the upper side of the handle, practically closing its front end and materially stiffening it. The flanges or marginal portions 4ᶜ of the boss are preferably spot-welded to the pan, but may be secured thereto by any other suitable means. As shown, the handle extension has a wide longitudinal depression in its upper side to form the bulging body of the boss.

In the embodiment of the invention illustrated in the drawings, the extension of the handle increases in width toward the lower end of its inclined portion 4ᵃ, so that it extends laterally beyond the sides of the handle while the horizontal portion 4ᵇ is tapered toward its front end, but the invention is not intended to be limited to this particular form. The lower side of the handle is cut away at its front end, as shown at 6, but its side portions 7 are left intact to form webs or braces which unite the inclined portion of the boss with the side walls of the handle, thereby materially strengthening and stiffening said inclined portion.

By constructing the boss in one piece with the handle, the entire pan can be made of untinned plate, instead of tin plate, which is necessary when the boss is made separate from the handle and soldered to the pan. This integral construction also produces a neater handle and boss and is less expensive than the old construction in which these parts are separate.

While my invention is herein shown and described in connection with a dust pan, it is not confined to this use but is also applicable to pans, scoops and similar devices.

I claim as my invention:

1. A handle for a dust pan and the like, having a boss-extension formed in one piece therewith and consisting of an inclined rear portion adapted to be secured to the rim of a dust pan and a substantially horizontal front portion adapted to be secured to the bottom of the pan, said inclined portion extending downwardly from the upper side of the handle and practically closing its front end and the side walls of the handle being integrally connected with said inclined portion to brace it.

2. A handle for a dust pan and the like, having a boss-extension formed in one piece therewith, said extension forming a continuation of the upper side of the handle and consisting of an inclined rear portion adapted to be secured to the rim of a dust pan and a substantially horizontal front portion adapted to be secured to the bottom of the pan, the front portion of the handle being cut away on its underside, while the sides of said front portion are left intact and integrally united with the inclined boss-portion to brace the same.

Witness my hand this 16th day of July, 1914.

THEODORE R. HUGO.

Witnesses:
 EDW. H. KOCH,
 JOHN G. FISCHER.

Copies of this patent may be obtained for five cents each, by addressing the "Commissioner of Patents, Washington, D. C."